March 27, 1956     E. I. GROFF     2,739,544
DOUGH STICK DEPOSITOR FOR PRETZEL TWISTING MACHINE
Original Filed Sept. 21, 1951     2 Sheets-Sheet 1

INVENTOR.
EDWIN I. GROFF
BY
ATTORNEYS

March 27, 1956 E. I. GROFF 2,739,544
DOUGH STICK DEPOSITOR FOR PRETZEL TWISTING MACHINE
Original Filed Sept. 21, 1951 2 Sheets-Sheet 2

*INVENTOR.*
EDWIN I. GROFF
BY
ATTORNEYS

United States Patent Office 2,739,544
Patented Mar. 27, 1956

2,739,544

DOUGH STICK DEPOSITOR FOR PRETZEL TWISTING MACHINE

Edwin I. Groff, West Reading, Pa., assignor to Quinlan Pretzel Company, Inc., Reading, Pa., a corporation of Pennsylvania Original application September 21, 1951, Serial No. 247,631. Divided and this application August 30, 1952, Serial No. 307,288

5 Claims. (Cl. 107—6)

The present invention relates to pretzel twisting machines and is concerned primarily with a depositor which transfers dough sticks that have been formed on the rolling aprons to the forming units of the drum in properly timed relation. This application is a division of the co-pending application of Edwin I. Groff, Serial Number 247,631, filed September 21, 1951, and entitled "Pretzel Twisting Machine."

A pretzel twisting machine of the type with which the present invention is concerned includes as characteristic and essential elements, dough extruding and cut off mechanism, a roller apron assembly, and a drum into which is incorporated a plurality of individual forming units. The dough extruding and cut off mechanism supplies individual pieces of dough to the roller aprons which rolls them out into elongated, cylindrical strips.

After a dough strip is rolled out, it leaves the rolling aprons and must be delivered to the forming units. In the earlier machines of this same general type, each dough strip was simply delivered to a locality or position where it was picked up by the forming unit as it passed this position. Such an arrangement has proven to be unsatisfactory in several respects. In the first place, it has not been possible to maintain an accurate control of the dough strips and there were occasions when more than one strip would be located at the position where it is intended that one be picked up by the forming unit. Thus, the forming unit would pick up two strips and jamming would result. Then again, it has been impractical, if not impossible to insure that the dough strip would be picked up at exactly the right moment with respect to the operation of the forming unit.

The machine of this invention includes a novel assembly of forming units, and each of these forming units includes various instrumentalities that are positively operated in accurately-timed relation. This means that it is highly important that a single dough strip be delivered to each forming unit at exactly the right moment. With these conditions in mind, another highly important object of the present invention is to provide a new and highly-improved depositor which will take the dough strips from the rolling aprons and positively deliver them in accurately-timed relation to the forming units.

More in detail, the invention has as an object the provision, in a pretzel twisting machine of the type indicated, of a depositor which includes a timing pusher and a feed pusher. The operations of these pushers are accurately synchronized and a baffle arrangement provided so that the timing pusher can deliver one, and only one, dough strip to the feeding pusher. If a dough strip should be in position on the timing pusher for subsequent delivery to the feeding pusher, its presence will prevent the positioning of another dough strip thereon. Thus, if such a dough strip should come from the rolling aprons in improperly timed relation, it is simply rejected and passed down to a rejection belt. With the depositor of this invention, there is definite assurance that no more than a single dough strip can be delivered to any forming unit and the delivery is accurately timed. The worst that can happen is that some forming unit on one cycle of operation may fail to have a dough strip delivered thereto. However, such a condition is not serious and will not cause such jamming as would require stopping operation of the machine.

Various other more detailed objects and advantages of the invention, such as arise in connection with carrying out the above noted ideas in a practical embodiment, will in part become apparent, and in part be hereinafter stated as the description of the invention proceeds.

The invention therefore comprises a depositor which transfers dough strips from the rolling aprons to the forming units of the drum in properly timed relation with definite assurance that no more than a single strip will be delivered to any forming unit on a single cycle of operation.

For a full and more complete understanding of the invention, reference may be had to the following description and accompanying drawings wherein.

Figures 1, 2:
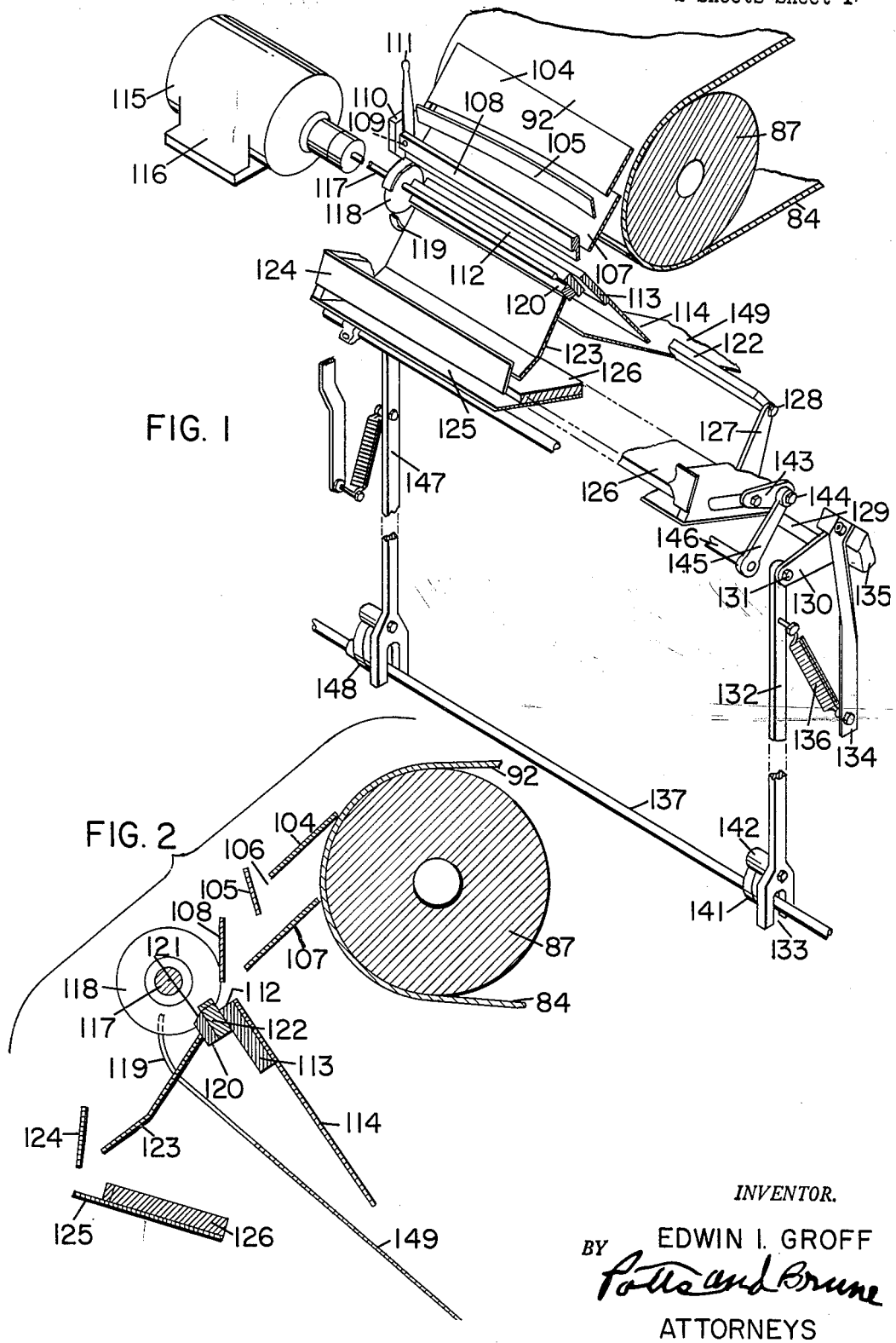
Figure 1 is a detailed perspective of the depositor with certain parts broken away and shown in section.
Figure 2 is a view, largely diagrammatic, taken as a vertical section through the depositor with parts omitted.

After a piece of dough has been rolled into an elongated strip by the action of the aprons, it passes from between these aprons and is positioned on the top ply 92 of the lower apron. Upon referring to Figures 1 and 2 it will be noted that from the top ply the dough strip having the arcuate shape passes onto an inclined top ramp 104. The lower edge of this ramp 104 is spaced from a curved baffle 105, the curvature being substantially that of the dough strip.

The dough strip has a momentum which is imparted thereto by the aprons so that when it strikes against the baffle 105 it is straightened. It then falls down through the space 106 between the edge of the ramp 104 and baffle 105 and falls onto a bottom ramp 107.

Spaced from the lower edge of the bottom ramp 107 is an adjustable baffle 108 which is pivotally mounted, as indicated at 109, in brackets 110 at the opposite ends thereof which are carried by the frame of the machine. This adjustable baffle 108 is provided with a handle 111 which may be availed of in adjusting the position of the baffle relative to the bottom ramp 107.

After passing down the ramp 107, the dough strip strikes the baffle 108 and falls through the space between the two onto a narrow ledge 112 which is just sufficiently wide to accommodate a single dough strip. The ledge 112 is defined by the upper edge of a wooden crosspiece 113 which assumes the angular position illustrated in Figures 1 and 2 and which is carried by the frame of the machine. Secured to the upper face of this crosspiece 113 is an inclined stainless steel plate 114 which functions as a reject ramp. Should the ledge 112 be occupied by a dough strip at the time when another dough strip falls down through the space between the ramp 107 and the baffle 108, it will be diverted onto the reject ramp 114 and passed onto the reject conveyor in a manner to be later described.

An electric motor is represented at 115 in Figure 1. This motor is mounted on the framework of the machine at the right-hand side by bracket 116 and has a drive shaft to which is drivably connected a shaft 117 which carries a pair of cutting discs 118. These cutting discs are arranged at the opposite ends of the ledge 112 and serve to trim the ends of a dough strip resting thereon to effect the proper length required for the subsequent twisting operations. These discs 118 rotate at a relatively high speed, in the nature of 1,500 R. P. M., to insure of a clean cut. Beneath each disc 118 there is a curved apron 119 for catching the trimmed ends and passing them onto the reject conveyor.

Spaced from the lower crosspiece 113 is a second crosspiece 120 having a beveled upper edge 121. Between the crosspieces 113 and 120 there is slidably positioned a timing pusher 122. This pusher operates with a reciprocating motion. Figure 2 shows the position of the pusher just after it has pushed a dough strip up over the edge 121 of the crosspiece 120. It is evident that when in this position a dough strip may come from the ramp 107 and upon falling on the ledge 112 be maintained thereon by engagement with the side face of the pusher 122.

However, upon retraction of the pusher 122 into a lowermost position, this dough strip will fall off the ledge 112 and be engaged by the edge of the pusher 122.

After a dough strip passes over the beveled edge 121 of the crosspiece 120 it falls onto a transfer ramp 123. The latter is of the compound angular construction illustrated and the lower edge thereof is spaced from a feed baffle 124. Below the ramp 123 and baffle 124 there is a feed table 125 that is carried by the supporting framework of the machine, and slidably mounted for reciprocation on the upper surface of the said table 125 is a feed pusher 126. The operation of the feed pusher 126 is so synchronized, with respect to the operation of the timing pusher 122 by the connections about to be described, that when a dough strip falls down through the space between the lower edge of the ramp 123 and the baffle 124 the feed pusher 126 is in a retracted position. Thus, the dough strip falls in front of the edge of the pusher 126. After assuming this position, the pusher 126 moves upwardly to push the dough strip off the feed table 125 and onto a forming unit which will be in exactly the right position for receiving this dough strip.

From the above paragraph, it is apparent that the operation of the feed pusher 126 must be accurately timed in relation to rotation of the drum which carries the forming units and the operation of the feed pusher 122 must be accurately timed with respect to that of the feed pusher 126.

A pair of arms 127, one of which is illustrated in Figure 1, have one end pivotally connected to the timing pusher 122 as indicated at 128. These arms 127 are drivably carried by shaft 129 which is journalled in supports carried by the frame of the machine. Extending outwardly from this shaft 129 and drivably connected thereto is another arm 130. Pivotally connected to the free end of the arm 130, as indicated at 131, is a bar 132, the lower end of which is enlarged and formed with a slot 133.

A strap 134 depends from a supporting member 135 which is carried by the frame of the machine and a tension-coiled spring 136 has one end secured to the strap 134 and the other end to the bar 132. This spring normally exerts a tendency urging the bar 132 downwardly.

A shaft 137 extends transversely of the machine and carries at its left-hand end a sprocked over which passes a chain.

Drivably mounted on the shaft 137 is a cam 141 which is engaged by a cam follower in the form of a roller 142 that is carried by the arm 132. It will be noted that the slot 133 receives the shaft 137 with the latter functioning as a guide for positioning the lower end of the bar 132. The action of the spring 136 maintains the cam follower 142 in engagement with the cam 141.

It is evident that the rotation of the shaft 137 will cause reciprocation of the bar 132, which motion is transmitted through arm 130, shaft 129, and arms 127 to the timing pusher 122 to cause reciprocation of the latter. The shape of the cam 141 accurately insures that forward and backward movement of the timing pusher will take place at exactly the right time.

Pivotally connected to the opposite ends of the feed pusher 126 are a pair of links 143, one of which is illustrated in Figure 1. Pivotally connected to the other end of each link 143, as indicated at 144, is an arm 145 with each arm 145 being drivably carried by a shaft 146 which extends across the machine beneath the feed table 125. This shaft 146 drivably carries an arm that is comparable to the arm 130 (not illustrated) and to the free end of which arm is connected a bar 147. This bar 147 is reciprocated by a cam 148 that is drivably mounted on the shaft 137.

The arrangement of the cam follower and the spring for keeping the cam follower in engagement with the cam 148 is exactly the same as that described above in connection with the bar 132 and the cam 141. It is evident that the rotation of the shaft 137 reciprocates the arm 147 to oscillate the shaft 146 and thus reciprocate the feed pusher 126. Due to the fact that both the cams 141 and 148 are carried by the shaft 137, the operations of the timing pusher and feeding pusher are accurately synchronized.

Figure 3:
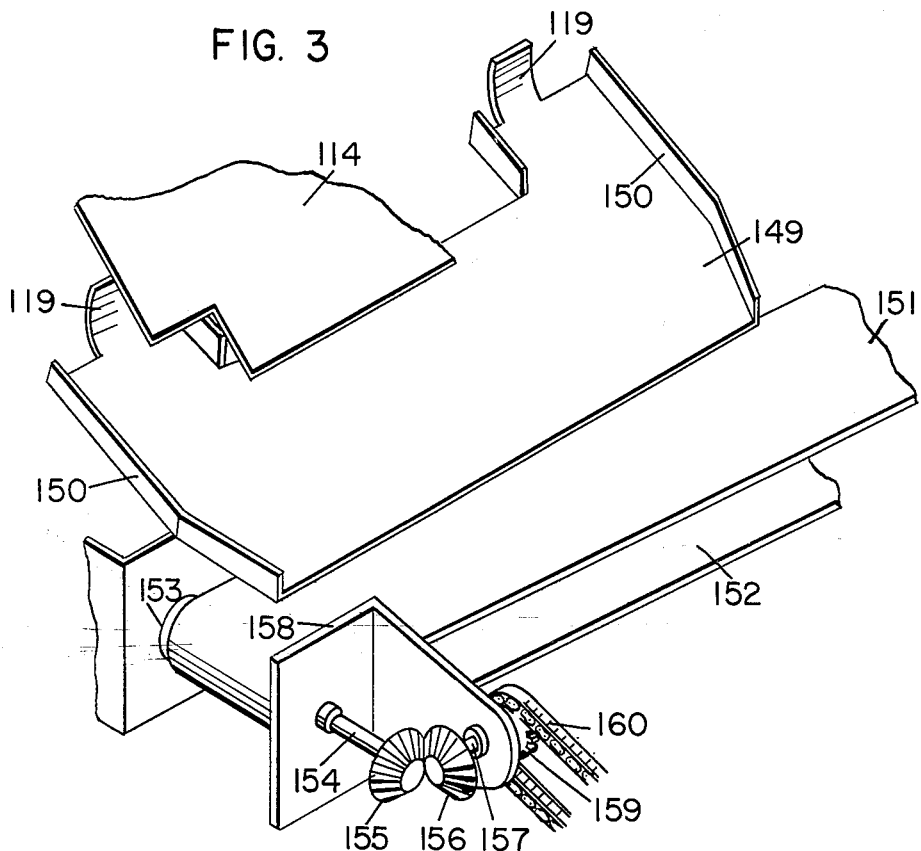
Figure 3 is a detailed perspective of the conveyor belt which receives rejected strips and trimmed ends together with the parts immediately associated therewith.

Referring now more particularly to Figure 3, it will be noted that the curved aprons 119 which are positioned beneath the trimming knives are formed as integral parts of a return ramp 149. Moreover, the reject ramp 114 has its lower edge positioned over the return ramp 149 so that a rejected dough strip will pass from the reject ramp onto the return ramp.

The return ramp 149 is provided with side flanges 150 which converge at the bottom and which retain the pieces of dough on the ramp. The lower edge of this return ramp 149 is positioned over the top ply 151 of a return conveyor 152 which extends transversely across the machine which is forwardly of and beneath the depositor. The return conveyor 152 passes over two rollers in the usual manner with one of the rollers being constituted the driving roller. This driving roller is shown at 153.

The driving roller 153 is carried by shaft 154, the free end of which carries a beveled gear 155. Meshing with the gear 155 is a complemental gear 156 that is drivably carried by a stub shaft 157. Both the shafts 154 and 157 are journalled in the two parts of an angle bracket 158 that is supported from the frame of the machine and the end of the stub shaft 157 remote from the beveled gear 156 drivably carries a sprocket 159. Passing over the sprocket 159 is a chain 160.

It is evident that the conveyor belt 152 is driven so that the top ply 151 would take dough from the return ramp 149 and transfer it to the right hand side of the machine where it may be received by a suitable receptacle for subsequent feeding to the supply hopper.

While a preferred specific embodiment of the invention is hereinbefore set forth, it is to be clearly understood that the invention is not to be limited to the exact construction, mechanisms, and devices illustrated and described because various modifications of these details may be provided, in putting the invention into practice within the purview of the appended claims.

What is claimed is:

1. In a pretzel twisting machine, a depositor for transferring dough strips to forming units in timed sequence comprising, an inclined top ramp for initially receiving a dough strip, a baffle below the lower edge of said inclined ramp and lying in spaced relationship therewith so as to define a gap through which the dough strip may fall, an inclined bottom ramp beneath said top ramp and baffle, a lower baffle adjacent to the lower edge of said inclined bottom ramp and lying in spaced relationship therewith so as to define a second gap through which the dough strip may fall, a dough strip receiving member positioned below said second gap and adapted to receive the dough strip as it falls therethrough, a timing pusher adjacent to said dough strip receiving member and adapted to push the dough strip therefrom, a transfer ramp below the said timing pusher, the said transfer ramp receiving the dough strip as it is pushed from the dough receiving member by the timing pusher, a feed baffle lying in spaced adjacent relationship with the lower edge of the transfer ramp defining a feed gap, a feed table below said feed gap for receiving the dough strip as it falls through said gap, a feed pusher slidable over said table for pushing the dough strip therefrom, and synchronized driving connections attached to said timing pusher and feeding pusher.

2. In a pretzel twisting machine, a depositor for transferring dough strips to forming units in timed sequence comprising; an inclined top ramp for initially receiving a dough strip; a baffle below the lower edge of said inclined ramp and lying in spaced relationship therewith so as to define a gap through which the dough strip may fall; an inclined bottom ramp beneath said top ramp and baffle; a lower baffle adjacent to the lower edge of said inclined bottom ramp and lying in spaced relationship therewith so as to define a second gap through which the dough strip may fall; an inclined crosspiece beneath said second gap having a top surface, a bottom surface and a top edge; the top edge of said crosspiece being adapted to receive the dough strip as it falls through said second gap; a timing pusher mounted for reciprocation on the undersurface of said crosspiece and adapted to push the dough strip from the top edge of said crosspiece; a transfer ramp below the said timing pusher for receiving the dough strip as it is pushed from the edge of the crosspiece; a feed baffle lying in spaced adjacent relationship with the lower edge of the transfer ramp defining a feed gap; a feed table below said feed gap for receiving the dough strip as it falls therethrough; a feed pusher slidable over said table for pushing the dough strip therefrom; and synchronized driving connections attached to said timing pusher and feeding pusher.

3. In a pretzel twisting machine, a depositor for transferring dough strips to forming units in timed sequence comprising; an inclined top ramp for initially receiving a dough strip; a baffle below the lower edge of said inclined ramp and lying in spaced relationship therewith so as to define a gap through which the dough strip may fall; an inclined bottom ramp beneath said top ramp and baffle; a lower baffle adjacent to the lower edge of said inclined bottom ramp and lying in spaced relationship therewith so as to define a second gap through which the dough strip may fall; a pair of inclined crosspieces arranged in spaced relation and lying beneath said second gap; the upper crosspiece presenting a ledge below said second gap for receiving a single dough strip as it falls therethrough; a timing pusher slidably mounted between said crosspieces and adapted to push the dough strip from said ledge; a transfer ramp below the lower crosspiece for receiving the dough strip as it is pushed from the ledge of said upper crosspiece; a feed baffle lying in spaced adjacent relationship with the lower edge of the transfer ramp defining a feed gap; a feed table below said feed gap for receiving the dough strip as it falls therethrough; a feed pusher slidable over said table for pushing the dough strip therefrom; and synchronized driving connections attached to said timing pusher and feeding pusher.

4. In a pretzel twisting machine, a depositor for transferring dough strips to forming units in timed sequence comprising; an inclined top ramp for initially receiving a dough strip; a baffle below the lower edge of said inclined ramp and lying in spaced relationship therewith so as to define a gap through which the dough strip may fall; an inclined bottom ramp beneath said top ramp and baffle; a lower baffle adjacent to the lower edge of said inclined bottom ramp and lying in spaced relationship therewith so as to define a second gap through which the dough strip may fall; a pair of inclined crosspieces arranged in spaced relation and lying beneath said second gap; the upper crosspiece presenting a ledge below said second gap for receiving a single dough strip as it falls therethrough; a reject ramp attached to said upper crosspiece for receiving rejected dough strips as they fall through said second gap; a pair of cutting discs mounted at the ends of said crosspieces for trimming the ends of the dough strips in readiness for being twisted; a timing pusher slidably mounted between said crosspieces and adapted to push the trimmed dough strips from the ledge of the upper crosspiece; a transfer ramp below the lower crosspiece for receiving the trimmed dough strip as it is pushed from said ledge; a feed baffle lying in spaced adjacent relationship with the lower edge of the transfer ramp defining a feed gap; a feed table below said feed gap for receiving the dough strip as it falls therethrough; a feed pusher slidable over said table for pushing the dough strip therefrom; and synchronized driving connections attached to said timing pusher and feeding pusher.

5. In a pretzel twisting machine, a depositor for transferring dough strips to forming units in timed sequence comprising; an inclined top ramp for initially receiving a dough strip; a baffle below the lower edge of said inclined ramp and lying in spaced relationship therewith so as to define a gap through which the dough strip may fall; an inclined bottom ramp beneath said top ramp and baffle; a lower baffle adjacent to the lower edge of said inclined bottom ramp and lying in spaced relationship therewith so as to define a second gap through which the dough strip may fall; a pair of inclined crosspieces arranged in spaced relation and lying beneath said second gap; the upper crosspiece presenting a ledge below said second gap for receiving a single dough strip as it falls therethrough; a reject ramp attached to said upper crosspiece for receiving rejected dough strips as they fall through said second gap; a pair of cutting discs mounted at the ends of said crosspieces for trimming the ends of the dough strips in readiness for being twisted; curved aprons integral with said reject ramp and lying below each of the cutting discs for receiving the trimmed edges of the dough strips; a timing pusher slidably mounted between said crosspieces and adapted to push the trimmed dough strips from the ledge of the upper crosspiece; a transfer ramp below the lower crosspiece for receiving the trimmed dough strip as it is pushed from said ledge; a feed baffle lying in spaced adjacent relationship with the lower edge of the transfer ramp defining a feed gap; a feed table below said feed gap for receiving the dough strip as it falls therethrough; a feed pusher slidable over said table for pushing the dough strip therefrom; and synchronized driving connections attached to said timing pusher and feeding pusher.

References Cited in the file of this patent

UNITED STATES PATENTS

| Number | Name | Date |
| --- | --- | --- |
| 125,536 | Brunjes | Apr. 9, 1872 |
| 497,098 | Kelley | May 9, 1893 |
| 1,397,233 | Robbins | Nov. 15, 1921 |
| 1,821,001 | Bower | Sept. 1, 1931 |
| 2,026,526 | Gipe | Jan. 7, 1936 |
| 2,256,927 | Pittman | Sept. 23, 1941 |
| 2,295,246 | Weida | Sept. 8, 1942 |
| 2,629,340 | Allen | Feb. 24, 1953 |